United States Patent [19]
Bashforth et al.

[11] Patent Number: 5,499,029
[45] Date of Patent: *Mar. 12, 1996

[54] WIDE BAND STEPPED FREQUENCY GROUND PENETRATING RADAR

[75] Inventors: Michael B. Bashforth, Buellton; Duane Gardner; Douglas Patrick, both of Santa Maria; Tricia A. Lewallen, Ventura; Sharyn R. Nammath, Santa Barbara; Kelly D. Painter, Goleta, all of Calif.; Kenneth G. Vadnais, Alexandria, Va.

[73] Assignee: EG&G Energy Measurements, Inc., Las Vegas, Nev.

[*] Notice: The portion of the term of this patent shall not extend beyond the expiration date of Pat. No. 5,325,095.

[21] Appl. No.: 234,441

[22] Filed: Apr. 28, 1994

Related U.S. Application Data

[63] Continuation-in-part of Ser. No. 913,494, Jul. 14, 1992, Pat. No. 5,325,095.

[51] Int. Cl.[6] ............................. G01S 13/24; G01S 13/04
[52] U.S. Cl. ............................. 342/22; 342/129; 342/194
[58] Field of Search ................................. 342/22, 27, 127, 342/129, 192, 194, 196

[56] References Cited

U.S. PATENT DOCUMENTS 4,896,116  1/1990  Nagashima et al. ................. 324/329
5,325,095  6/1994  Vadnais et al. ......................... 342/22
5,345,240  9/1994  Frazier ..................................... 342/28

Primary Examiner—John B. Sotomayor
Attorney, Agent, or Firm—Miquel A. Valdez; William C. Daubenspeck; William R. Moser

[57] ABSTRACT

A wide band ground penetrating radar system (10) embodying a method wherein a series of radio frequency signals (60) is produced by a single radio frequency source (16) and provided to a transmit antenna (26) for transmission to a target (54) and reflection therefrom to a receive antenna (28). A phase modulator (18) modulates those portion of the radio frequency signals (62) to be transmitted and the reflected modulated signal (62) is combined in a mixer (34) with the original radio frequency signal (60) to produce a resultant signal (53) which is demodulated to produce a series of direct current voltage signals (66) the envelope of which forms a cosine wave shaped plot (68) which is processed by a Fast Fourier Transform unit 44 into frequency domain data (70) wherein the position of a preponderant frequency is indicative of distance to the target (54) and magnitude is indicative of the signature of the target (54).

19 Claims, 4 Drawing Sheets

WIDE BAND STEPPED FREQUENCY GROUND PENETRATING RADAR

The United States Government has rights in this invention pursuant to Contract No. DE-AC08-83NV10282 between the United States Department of Energy and EG&G Energy Measurements, Incorporated.

RELATIONSHIP TO OTHER APPLICATIONS

This is a continuation-in-part of application Ser. No. 07/913,494 filed Jul. 14, 1992 now U.S. Pat. No. 5,325,095.

BACKGROUND OF THE INVENTION

The present invention relates generally to radar systems and more particularly to radar specifically adapted for penetrating soil and similar obstructions.

In the prior art it has been the practice in ground penetrating radar systems to employ baseband video pulse radar technology. Unfortunately, although it would be desirable that the transmit and receive signal pulses of the radar be of similar shape and size, distortion occurs in the return in the form of a ringing effect, due to antenna characteristics, soil attenuation properties and the location of targets in the antenna's near field. This ringing phenomenon can be very complex and extremely difficult to decorrelate when trying to extract relevant information. In addition, in order to achieve adequate resolution, the system must use very fast pulses. This places a finite limit on the average power which, in turn, reduces the signal to noise ratio of the system. Another problem is the lack of phase information in such prior art systems which, if available, could yield an improvement in the radar return signal through he use of digital signal processing.

Among the more difficult problems which have been identified in such prior art systems are the unutilized low frequency components of the radar pulse signal, the lack of coherence, and the inherently low average power of such systems. In addition, the difficulty of building high dynamic range sampling hardware, the lack of a broadband, high isolation, fast transmit/receive switch, and the apparently impossible task of building an antenna to radiate the entire signal bandwidth, have indicated the need for an entirely different approach to providing a radar system for detecting anomalies in geophysical media.

The deficiencies of commercial radar systems have also been noted by others in the field. For example, U.S. Pat. No. 4,218,678, issued to Fowler et al., discloses an earth penetrating radar system having a transmitter section and a distinct receiver section. In the transmitter portion, a digital signal from a microprocessor and a base periodic signal from a master oscillator are both fed to a frequency synthesizer where the signals are multiplied to produce a base reference signal which passes through an attenuator control and an amplifier to a transmitter antenna. Stepped frequency signals making up the Fourier frequency spectrum of the desired synthetic radar pulse are transmitted. In the receiver portion, a digital signal from the microprocessor and a base periodic signal from the master oscillator are both fed to a second frequency synthesizer where the signals are also multiplied to produce a base reference signal. The second synthesizer also includes a quadrature circuit wherein the base reference signal is converted into an in-phase reference signal and a quadrature reference signal. An incoming signal passes from a receiving antenna to an RF amplifier, the output of which is mixed with both the in-phase and quadrature reference signals to provide both in-phase and quadrature output signals. The in-phase and quadrature output signals are then digitized and recorded for each frequency, together with the frequency, until all frequencies have been transmitted and the corresponding return signals received, and a time trace is then reconstructed by inversely transforming the in-phase and quadrature values.

U.S. Pat. No. 4,381,544, issued to Stamm, describes a serial survey technique wherein microwave pulses of several frequencies are radiated to the ground from an antenna on an airborne platform. Part of each radiated pulse penetrates the ground and is absorbed or scattered and reflected by changes in the subsurface dielectric properties at the interfaces between materials having different dielectric properties. A detector, also mounted on the airborne platform, senses the reflected signals and has an empirically determined set of reflection criteria for each potential material interface.

U.S. Pat. No. 4,435,708, issued to Kuriakos, discloses a radio altimeter which uses a triangular modulating waveform for a frequency modulated transmitter. Digital means, synchronized with the triangle wave generator, produces a count gate which is at a high logic level during most of the linear portion of the triangle wave period, and which is at a low level during the portion of the period of the triangle wave near the wave peaks. The count gate and the beat frequency, produced by mixing transmitted and received signals, are applied to logic means which modifies the duration of the high level state of the count gate to produce a derived count gate having a high logic level always of such duration as to equal an integral number of cycles of beat frequency signal. The derived count gate is then used to control a beat frequency counter and a precision clock counter. The outputs of these counters are then arithmetically processed to yield digital altitude information free of step error.

U.S. Pat. No. 4,504,833, issued to Fowler et al., discloses a system similar to that disclosed in the previously referenced Fowler et al. '678 Patent except that, in the receiver portion of the system, the digital signal from the microprocessor and the base periodic signal from the master oscillator are both fed to an offset synthesizer, while only the base periodic signal is fed to a quadrature circuit. The output of the offset synthesizer is mixed with the incoming signal from the receiver antenna and the RF amplifier in a receiver mixer, the output of which is then fed to a power divider where the signal is fed to both a first and a second mixer. The respective in-phase and quadrature signals are also fed to the first and second mixers to provide in-phase and quadrature output signals. U.S. Pat. No. 4,620,192, issued to Collins, describes a radar system wherein a signal from a master oscillator is mixed with a voltage controlled oscillator and the resulting signal is then passed through a filter before being amplified and sent to the transmitter antenna. A portion of the signal being transmitted is also coupled to the receiver to provide a local oscillator signal which is an undelayed replica of the transmitted signal. The incoming signal at the receiver antenna is split and sent to two mixers. The undelayed replica signal is also split and sent to two mixers, after changing the phase of one of the signals by 90°. The signals are heterodyned in each mixer to respectively provide in-phase and quadrature output signals from the mixers. The signals are then sent to a notch filter which will attenuate ground signals and pass any target return signals centered on a Doppler shift frequency differing substantially from a zero frequency. The filtered signals are then digitized and passed to a digital signal processor which includes a digital correlator, a Fast Fourier Transform ("FFT") signal processor, a magnitude processor, a memory, and a constant false alarm rate ("CAFR") processor. The digital signal processor converts the digitized time domain data into a range/Doppler map and reports CAFR threshold crossings with that map to a digital computer.

U.S. Pat. No. 4,670,753, issued to Vacanti, describes a dual channel radar system wherein a transmitted FM signal, which has been circularly polarized in one direction, sweeps a predetermined frequency range. The return signal, which is polarized in both directions, is received by the same antenna, and the received reflections are mixed with samples of the transmitted signal to produce baseband frequency signals on two channels representing, respectively, right- and left-circularly polarized reflections. The signals are processed by an FFT element to produce digitized I and Q signals for each channel. The minimum power measurements for each channel are determined and then compared in order to locate targets in the target area.

However, despite these attempts to improve upon existing commercial radar systems, there has still been a need for a radar system which will distribute the transmitted signal power requirements in a manner which will provide an increase in the system's overall average power, thus resulting in a less complicated and more reliable radar system, as well as providing a increase in the system signal to noise ratio. In addition, there has remained a need for a radar system which is capable of preserving the phase information of the radar return signal and which will take full advantage of digital signal processing techniques, thus providing an increase in the target detection ability of the system. Such a system should also provide for more efficient use of transmitted power by generating signals covering only the frequency range in which a practical antenna radiates most efficiently.

Clearly, it would be desirable to have a relatively uncomplicated and reliable radar system which could provide a high average power signal with a corresponding increase in system signal to noise ratio, and further which would preserve the phase information of the radar return signal for digital processing and analysis of such phase information. To the inventors' knowledge, no such system has existed prior to the present invention and that described and claimed in copending application Ser. No. 07/913,494.

SUMMARY OF THE INVENTION

Accordingly, it is an object of the present invention to provide a ground penetrating radar which distributes transmitted signals in a manner that will provide an increased overall average power.

It is another object of the present invention to provide a radar system with a high signal to noise ratio.

It is still another object of the present invention to provide a radar system which will preserve phase information of the radar return signal for analysis thereof.

It is yet another object of the present invention to provide a radar system which is reliable and relatively uncomplicated.

It is still another object of the present invention to provide a radar system that will detect objects within the ground with sufficient clarity to accurately determine the size and depth of such objects.

Briefly, the present invention is embodied in a ground penetrating radar utilizing a wide band stepped frequency signal for determining the distance and characteristics of objects buried beneath the surface of the ground. Such a system is made possible through application of the inventive method.

An advantage of the present invention is that transmitted signals are distributed in a manner that will provide an increased overall average power.

Another advantage of the present invention is that the radar system operates with a high signal to noise ratio, thus increasing system accuracy and decreasing the chances of an anomalous reading.

Yet another advantage of the present invention is that phase information relative to the transmitted signal and the returned signal is preserved, thus allowing sophisticated digital analysis of such phase information to better determine the characteristics of detected objects.

Still another advantage of the present invention is that the use of a single signal generating means increases the simplicity and reliability of the system.

Yet another advantage of the present invention is that objects within the ground can be detected with increased certainty, and that the size, distance, and shape of such objects can be determined with greater accuracy than has been possible using prior art radar systems.

DETAILED DESCRIPTION OF THE INVENTION

The best presently known mode for carrying out the invention is a wide band ground penetrating radar system. The predominant expected usage of the wide band ground penetrating radar system is in the detection of buried objects such as land mines, containers of toxic waste and the like, wherein accurate detection and identification of such objects is essential.

The circuitry used for carrying out the invention has been described in detail in copending application Ser. No. 07/913, 494, of which this present application is a continuation in part, and that description is incorporated herein by reference thereto. Since the time of the filing of application Ser. No. 07/913,494, certain improvements have been made to this circuitry, and these will be discussed in more detail hereinafter.

Figure 1:
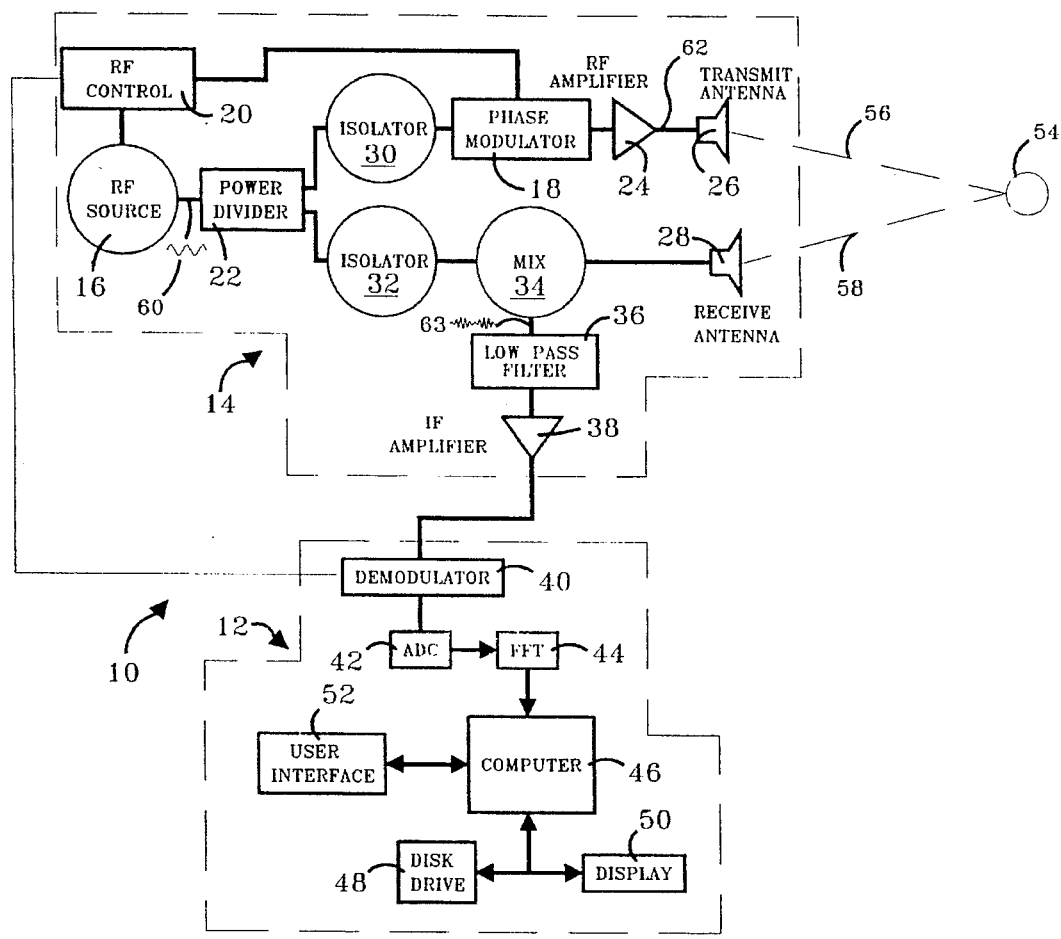
FIG. 1 is a block conceptual diagram of the inventive ground penetrating radar system.

The wide band ground penetrating radar system ("GPR") is shown in block diagrammatic form in the view of FIG. 1, and is designated therein by the general reference character 10. The best presently known embodiment 10 of the present invention is a portable, self contained unit having a signal processing/display subsystem 12 and a radio frequency ("RF") unit 14. The RF unit 14 has an RF source 16, a phase modulator 18, an RF control unit 20, a power divider 22, an RF amplifier 24, a transmit antenna 26, a receive antenna 28, a first isolator 30, a second isolator 32, a mixer 34, a low pass filter 36 and an intermediate frequency ("IF") amplifier 36.

The RF source 16 is a single, multi-octave phase lock loop circuit capable of generating local oscillator signals from 100 MHz to 1000 MHz. The RF control unit 20 controls the RF source 16 to step (as opposed to sweeping or pulsing) with a minimum step size of 2 MHz. The provision of the phase lock loop RF source 16 in the best presently known embodiment 10 of the present invention increases the accuracy of the frequency steps, which results in improved target detection. The RF source 16, under control of the RF control 20, provides radio frequency output to the power divider 22. The isolators 30 and 32 are provided, as shown in the view of FIG. 1, to prevent "cross talk" between the input and output signals within the circuitry of the RF unit 14. Modulated signal from the phase modulator 18 is amplified by the RF amplifier 24 and transmitted from the transmit antenna 26. Returned signals from the receive antenna 28 are mixed in the mixer 34 with a the signal originally produced at the RF source 16 which has been provided to the mixer 34 through the power divider 22 and the second isolator 32. Output from the mixer is provided through the low pass filter 36 and the IF amplifier 38

In the RF unit 14, the RF source 16 linearly steps from 100 MHz to 1,000 MHz. Data is taken at 451 frequencies through this 900 MHz bandwidth at 2.0 MHz step intervals. At each frequency, both in-phase and quadrature data are taken, resulting in 902 data samples per frequency "sweep". Each sweep takes 0.2 seconds to complete. The phase modulation frequency of the best presently known embodiment 10 of the present invention is 500 KHz. The quantity and step interval of samples was chosen to obtain the required unambiguous range. The frequency range of 100 to 1000 MHz was chosen based an anticipated target size, antenna size and the necessary bandwidth required to obtain the necessary resolution. These aspects are explained in more detail in the copending application Ser. No. 07/913, 494 and one skilled in the art will, with a minimum amount of experimentation, be capable of making any necessary adjustments to account for variations in antenna size, anticipated target size, or the like.

The signal processing/display subsystem has a demodulator 40, an analog to digital convertor ("ADC") 42, a Fast Fourier Transform ("FFT") unit 44, and a computer 46 with a disk drive 48, a display 50 and a user interface 52. Also shown in the view of FIG. 1 are a target 54 which is representative of an object which might be detected by the GPR 10, a transmit signal path 56 which is the path from the transmit antenna 26 to the target 54, and a receive signal path 58 which is the path from the target 54 to the receive antenna 28.

According to the present invention, the RF unit 14, as previously discussed herein, has the single RF source 16 (as compared to having separate RF sources for transmitter and receiver, or such similar prior art arrangement), for producing an RF signal 60. (Note that, on FIG. 1, the RF signal 60 is illustrated by reference to the point in the best presently known embodiment 10 of the present invention wherein the described RF signal is present. Other signals yet to be described herein will also be so referenced in FIG. 1 while, where relevant, such signals will also be depicted in additional figures to more specifically illustrate the pertinent characteristics of such signals.) The RF signal 60 is divided by the power divider 22 and provided, through the first and second isolators 30 and 32 respectively, to the (transmit) phase modulator 18 and the mixer 34. The phase modulator 18 modulates the signal from the first isolator 30 between 0° and 180° in phase, or between 90 and 270 degrees in phase, at a 500 KHz rate, under the control of the RF control 20. A modulated signal 62 from the phase modulator 18 is amplified by the RF amplifier 24 and transmitted from the transmit antenna 26 along the transmit signal path 56, reflected from the target 54, returned to the receive antenna 28 along the receive signal path 58 and mixed in the mixer 34 with the original unmodulated RF signal 60 which, as previously described herein, has been provided to the mixer 34 through the second isolator 32.

For a given signal frequency ($F_i$), the modulated signal 62 which is transmitted from the transmit antenna 26 can be expressed as:

$$V_{xmit} = \cos(\omega_i t + M(t))$$

where:

t=time $\omega_i$=angular frequency=$2\pi F_i$

M(t)=phase term due to phase modulator 18

The signal at the receive antenna 28, can then be expressed as:

$$V_{rec} = \cos(\omega_i t + M(t) + \Phi_i)$$

where:

$\Phi_i$=phase delay due to combined length of paths 56 and 58 which is given by:

$$\Phi_i = \frac{D F_i}{c}$$

where:

D=combined path length of paths 56 and 58 c=propagation velocity of the signal 62 (media dependent)

In effect, the signal received at the receive antenna 28 is simply the original RF signal 60 plus the cumulative phase term added by the phase modulator 18 and the delay caused by the combined lengths of the signal paths 56 and 58.

The signal from the receive antenna 28 is mixed with the original RF signal 60 in the mixer 34, as described herein, and the filtered by the low pass filter 36, a resultant signal 63 can be expressed as:

$$MIXER_{out} = \cos(M(t) + \Phi_i)$$

The resultant signal 63 can be described as a 500 KHz square wave having an amplitude equal to the cosine of the phase term $\Phi_i$. The alternating current resultant signal 63 can be amplified by the 500 KHz IF amplifier 38 well away from low frequency 1/f noise (noise inversely proportional to frequency). When the amplified resultant signal 63 is demodulated in the demodulator 40 with the 500 KHz reference from the RF control 20, a DC signal 64 (FIGS. 3 and 4) results which represents the cosine of the phase shift due to the combined lengths of signal paths 56 and 58.

Figure 2:
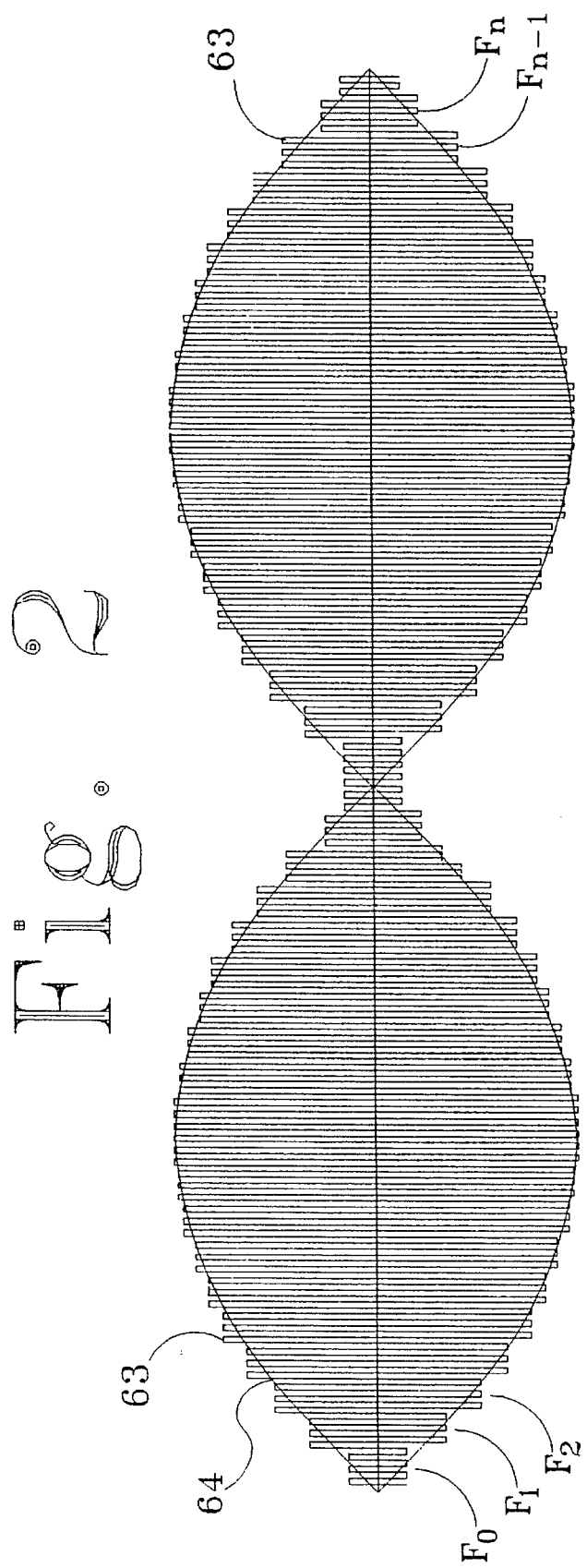
FIG. 2 is a diagrammatic representation of a resultant signal according to the present inventive method.

In the above description, the RF source 16 was set at a single frequency F. When the RF source 16 is stepped in equal increments from $F_0$ to $F_1$ through $F_n$, the resultant signals 60 corresponding to each such stepped RF signal 60 frequency, take on a sine wave shaped envelope 64, as shown in FIG. 2, due to the periodic nature of the phase shift caused by the combined lengths of the signal paths 56 and 58.

Figure 3:
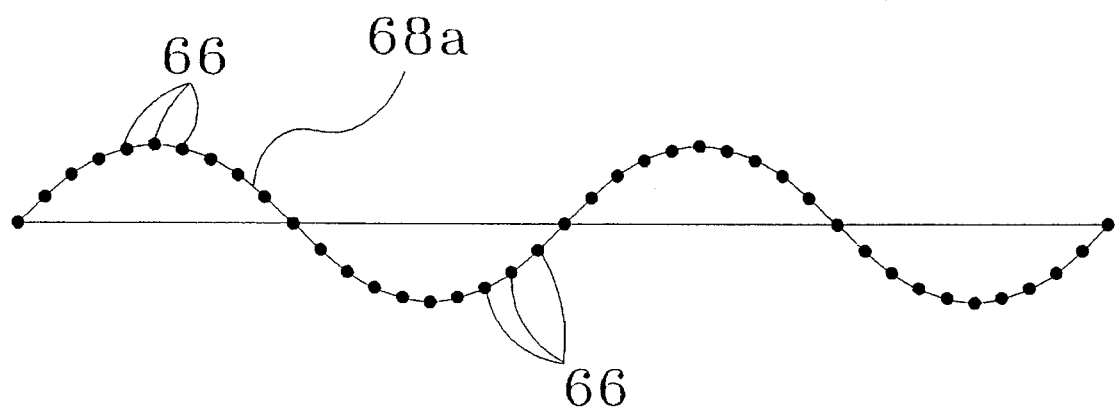
FIG. 3 is a graph depicting combined output DC voltages according to the present inventive method.

Referring now to FIG. 3, when the 500 KHz demodulation is performed by the demodulator 40, the series of DC voltages 65, when plotted, assumes a cosine wave 68 plotted form having a total phase change, as the RF source 16 is stepped from $F_0$ through $F_n$, which is given by:

$$\text{total phase change} = \frac{D(F_n - F_0)}{c}$$

The output of the demodulator 40 (the DC voltages 66) are digitized by the ADC 42 and the digitized data is then converted into a frequency domain representation by the Fast Fourier Transform Unit 44. Since the total phase change the modulated signal 62 as received at the receive antenna 58 is proportional to the range of the target 54 (the combined lengths of the signal paths 56 and 58), the conversion to the frequency domain representation allows range determination by the frequency of the digitized signal. Closer targets 54 produce smaller phase changes because the path from the transmit antenna 26 to the target 54 to the receive antenna 28 is shorter. This results in a lower frequency cosine wave plot 68 (68a of FIG. 3). More distant targets 54 produce greater total phase changes, and hence a higher frequency cosine wave plot 68 (68b of FIG. 4). It should be noted that the particular wave shapes which are illustrated in the various figures of the drawing accompanying this application are intended only to illustrate the points discussed. In particular, to include all of the data points and are wave peaks of the high frequency signals being discussed would result in an unreadable drawing at the required scale. Therefore, it should be noted that where any discrepancy might exist between the text herein and the details of the drawings, the text is intended to be numerically accurate.

Figure 4:
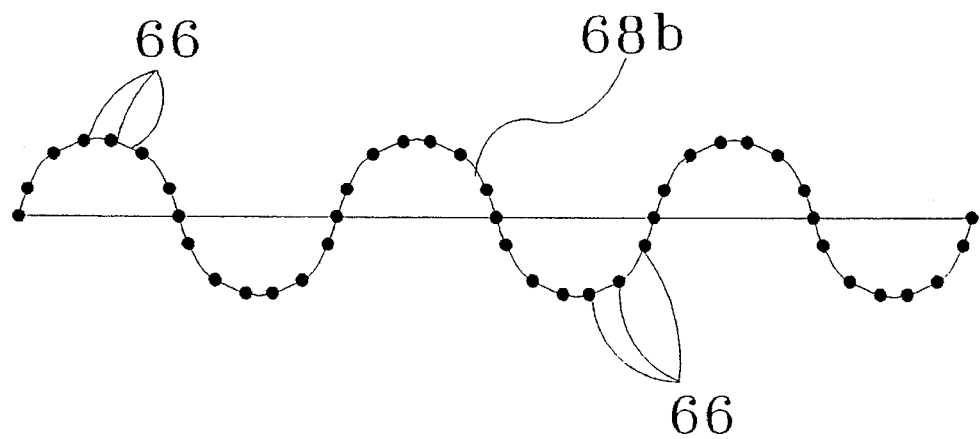
FIG. 4 is a graph, similar to the graph of FIG. 3, depicting combined output signals according to the present inventive method, and differing from FIG. 3 in that a different target distance is represented.
Figure 5:
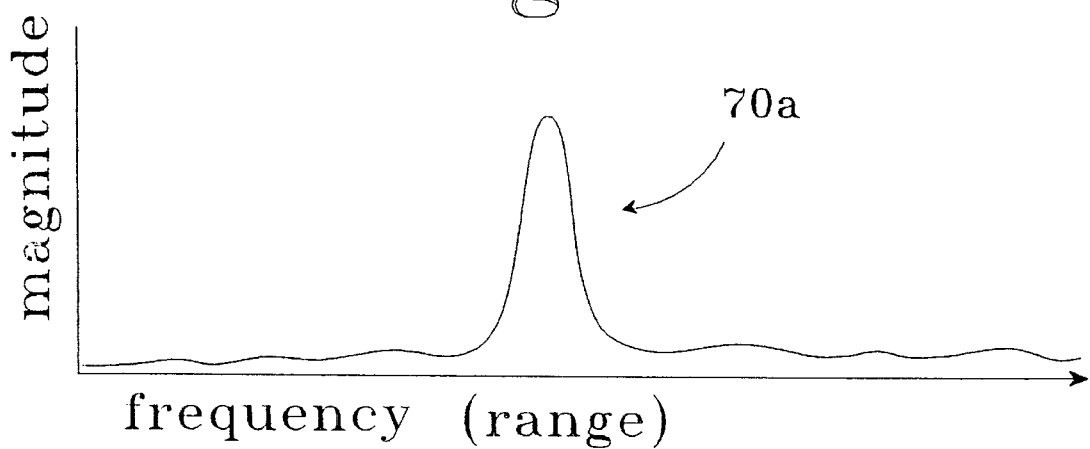
FIG. 5 is a frequency domain representation of the time domain graph of FIG. 3.
Figure 6:
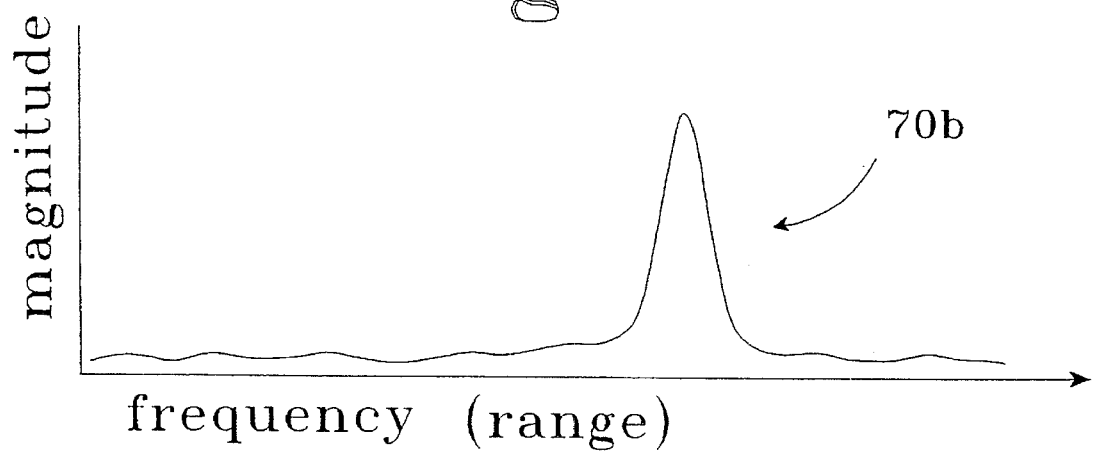
FIG. 6 is a frequency domain representation of the time domain graph of FIG. 4.

FIGS. 5 and 6 show frequency domain data traces 70a and 70b which are the frequency domain representations of the time domain plotted cosine wave shape 68 data of FIGS. 3 and 4, respectively. Thus, as shown in FIG. 6 (correspond to the higher frequency plotted cosine wave shape 68b of FIG. 4) the frequency spectra moves to the right for deeper targets 54 (along the abscissa of the graph), while the peak shown in FIG. 5 (corresponding to the lower frequency plotted cosine wave shape 68a of FIG. 3) is shown further to the left, indicating that the target is closer or at a more shallow depth. The magnitude of the frequency spectra data trace 70 is proportional to the reflectivity, or radar cross section of the target 54.

As previously discussed herein, unlike prior art radar systems, the GPR 10 of the present invention has a single RF source or generator (the RF source 16) to provide the same signal to both the transmitting and receiving portions of the system. The advantage of this (other than the obvious advantages of reduced cost and increased simplicity) is that, with a single signal generator, the frequency and amplitude of the signal being fed to the transmit portion of the system is identical to the frequency and amplitude of the signal being fed to the receive portion of the system. That is, one does not need to synchronize the output of two different signal generators or synthesizers.

It will also be noted that only the single mixer 34 is used in the GPR 10 of the present invention for both the in-phase and quadrature signals (these not being separated, except by time, in the present invention) again unlike comparable prior art devices wherein in-phase and quadrature signals are each respectively mixed in separate mixers with split portions of the incoming signal. While the provision of in-phase and quadrature signals provides a phase modulation which permits maintenance of a coherent, complex time domain signal, by phase modulating the in-phase component between 0° and 180°, and between 90° and 270° for the quadrature component, the use of the same mixer, or same channel, in accordance with the invention, for mixing both the in-phase and quadrature received signals with the signal from the isolator 32 again provides an economical advantage and a reliability advantage, as well as a technical advantage.

In the GPR 10, both the in-phase and the quadrature signals, being fed through the same mixer 34, are subject to the same variations in response and/or other operating parameters, unlike the prior art wherein differences might be due to artifacts of the components used in two different channels.

Thus, the GPR 10 of the present invention provides an improved radar system wherein anomalies in geophysical media may be detected through the use of frequency modulated continuous wave coherent radar, and wherein a single RF source 16 is used to provide the unmodulated RF signal 60 and the transmitted signal (the modulated signal 62). By the described inventive method, the single channel mixer 34 can be used to compare the reflected in-phase and quadrature signal aspects with the unmodulated signal 60 from the RF source 16.

As can be can be appreciated in light of the above description, in the GPR 10, the RF unit 14 acts as a microwave interferometer using the reflective properties of the target 54 to determine depth. Signals from the RF unit 14 are processed and interpreted in the signal processing/display subsystem 12. The demodulator 40 is housed in the signal processing/display unit 12 for improved noise immunity. The demodulated signal is sampled by the ADC 42 and digitized with 16 bit resolution. The FFT unit 44 of the best presently known embodiment 10 of the present invention is an IBM® personal computer based digital signal processing board. The inventive process is controlled by the computer 46, which is a conventional IBM® compatible personal computer. Data is displayed on the display 50 which, in the best presently known embodiment 10 of the present invention, is a low power 640×200 pixel liquid crystal display with a purple/blue coloration to improve readability in direct sunlight.

As previously noted herein, the enabling circuitry of the wide band ground penetrating radar 10 is essentially as described in the disclosure of application Ser. No. 07/913,494 with the exception that certain improvements have been included. A "next generation" PLL integrated circuit is used which permits the use of higher feedback frequencies. This has the desirable effect of allowing the multiplication factor necessary to produce the required frequencies to be reduced. With a lower multiplication factor, smaller frequency increments are possible with no loss in switching speed. Additionally, loop gain compensation in the phase locked loop RF source 16 is now provided by means of digitally controlled analog voltage, thereby allowing for corrections to be made for non-linear operation of the RF source 16. Digital values for control of such loop gain compensation are determined using measured output data. With this improved loop gain compensation, reliable phase-lock is ensured over the entire 100 MHz to 1000 MHz bandwidth. Antennas and other physical appurtenances of the best presently known embodiment 10 of the present invention are as disclosed in application Ser. No. 07/913,494.

Various modifications may be made to the invention without altering its value or scope. All of the above is only one example of available embodiments of the present invention. Those skilled in the art will readily observe that numerous other modifications and alterations may be made without departing from the spirit and scope of the invention.

Accordingly, the above disclosure is not intended as limiting and the appended claims are to be interpreted as encompassing the entire scope of the invention.

INDUSTRIAL APPLICABILITY

The wide band ground penetrating radar system 10 of the present invention may be used to detect buried objects, which may be natural objects such as oil, coal or ore deposits, or the absence of same such as underground caverns, rivers, or the like. The GPR 10 may also be used to detect man made objects such as buried ordnance, buried waste, underground storage tanks, pipes, sewer lines or buried cables.

In use, an operator can control the GPR 10 by means of the user interface 52 to produce information on the display 50 essentially in the form shown in FIGS. 4 and 5. Alternatively, the computer 46, or perhaps a separate more powerful computer (not shown) may be used to analyze the data and to assist in the interpretation thereof. The GPR 10 might also be used as one of several sensor inputs devices for a multi-sensor object detection device wherein other sensors could be metal detector devices and the like.

Since the present inventive ground penetrating radar 10 will more accurately determine the presence, size and depth of articles buried beneath the ground, that it will be widely accepted in any field wherein the detection of buried objects will be required. Therefore, it is anticipated that the utility and industrial applicability of the invention will be both significant in scope and long-lasting in duration.

We claim:

1. A method for determining the presence of an object, comprising:

producing signal pulses of varying frequencies;

transmitting said signal pulses from a transmit antenna and receiving said signal pulses which are reflected from the object at a receive antenna; and recombining each of said signal pulses as received at said receive antenna with itself as originally produced to produce a direct current voltage indicative of any phase difference between said signal pulses as received at said receive antenna and as originally produced.

2. The method of claim 1, wherein:

said signal pulses are phase modulated prior to being transmitted from said transmit antenna such that said signal pulses as received at said receive antenna are phase modulated.

3. The method of claim 2, wherein:

a succession of said direct current voltages is filtered and demodulated to produce a sine wave, the frequency of which sine wave correlates to distance from the transmit antenna to the target and back to the receive antenna.

4. The method of claim 1, wherein:

said signal pulses are produced at evenly spaced time and frequency step intervals such that an envelope of a series of said direct current voltages approximates a sine wave.

5. The method of claim 4, wherein:

said sine wave is transformed for analysis into frequency domain data.

6. The method of claim 5, wherein:

position of a frequency data trace is indicative of target distance.

7. The method of claim 5, wherein:

the peak magnitude of a frequency data trace is indicative of target size.

8. The method of claim 4, wherein:

said sine wave is converted by an analog to digital convertor into equivalent digital data and then processed by Fast Fourier Transform into a frequency domain equivalent.

9. The method of claim 1, wherein:

said signal pulses are divided such that identical versions of said signal pulses are sent to be processed for transmission and further for providing to a mixer wherein said signal pulses as generated are combined with said signal pulses as returned from the target.

10. The method of claim 9, wherein:

said signal pulses are produced at a radio frequency synthesizer;

a first isolator is interposed between the radio frequency synthesizer and said transmit antenna; and a second isolator is interposed between the radio frequency synthesizer and the mixer such that cross talk between divided portions of said signal pulses is prevented.

11. The method of claim 9, wherein:

a modulator is interposed between the radio frequency synthesizer and the transmit antenna for modulating a portion of signal pulse.

12. A stepped frequency radar system for detecting a target, comprising:

a single frequency source for producing signals of variable frequency;

a divider for dividing the signals;

a transmitter for transmitting a first divided portion of the signals;

a receiver for receiving the first divided portion of the signals as the first divided portion is reflected from the target; and a mixer for mixing the first divided portion of the signals with a second divided portion of the signals.

13. The stepped frequency radar system of claim 12, and further including:

a modulator interposed between said single frequency source and said transmitter.

14. The stepped frequency radar system of claim 13, and further including:

a demodulator for removing modulation from the output of said mixer.

15. The stepped frequency radar system of claim 14, and further including:

low pass filter means for removing high frequency content from the output of said mixer.

16. The stepped frequency radar system of claim 13, and further including:

Fourier Transform means for converting time domain signals from the mixer into frequency domain data.

17. The stepped frequency radar system of claim 16, wherein:

the Fourier Transform means is computerized Fast Fourier Transform unit.

18. The stepped frequency radar system of claim 13, wherein:

said signals are radio frequency electromagnetic pulses.

19. The stepped frequency radar system of claim 18, wherein:

said frequency source is a radio frequency synthesizer.

* * * * *